(12) United States Patent
Marusawa

(10) Patent No.: US 6,669,861 B2
(45) Date of Patent: Dec. 30, 2003

(54) Y-TYPE HEXAGONAL OXIDE MAGNETIC MATERIAL AND INDUCTOR ELEMENT

(75) Inventor: Hiroshi Marusawa, Moriyama (JP)

(73) Assignee: Murata Manufacturing Co. Ltd (JP)

( * ) Notice: Subject to any disclaimer, the term of this patent is extended or adjusted under 35 U.S.C. 154(b) by 3 days.

(21) Appl. No.: 09/943,234

(22) Filed: Aug. 31, 2001

(65) Prior Publication Data

US 2002/0050309 A1 May 2, 2002

(30) Foreign Application Priority Data

Sep. 1, 2000 (JP) .......................................... 2000-264944

(51) Int. Cl.$^7$ ................................................. H01F 1/34

(52) U.S. Cl. ...................................................... 252/62.63

(58) Field of Search ...................................... 252/62.63

(56) References Cited

U.S. PATENT DOCUMENTS 4,664,831 A * 5/1987 Hibst et al. ............... 252/62.59

FOREIGN PATENT DOCUMENTS

WO 96/15078 5/1996

* cited by examiner

*Primary Examiner*—C. Melissa Koslow
(74) *Attorney, Agent, or Firm*—Dickstein, Shapiro, Morin & Oshinsky, LLP.

(57) ABSTRACT

A Y-type hexagonal oxide magnetic material is provided containing at least Fe, Co, and M (where M is at least one of Ba and Sr) as well as O, wherein the relationship of $x+3\sigma \leq 4$ is satisfied, in which x represents the average grain size ($\mu$m) of a sintered compact thereof, and $\sigma$ represents the standard deviation of the grain size. When this material is used for a magnetic body of an inductor element, a high Q factor can be maintained in a high frequency range of not less than 200 MHZ.

18 Claims, 1 Drawing Sheet

Y-TYPE HEXAGONAL OXIDE MAGNETIC MATERIAL AND INDUCTOR ELEMENT

BACKGROUND OF THE INVENTION

1. Field of the Invention

The present invention relates to a Y-type hexagonal oxide magnetic material and an inductor element composed of this material. More particularly, the present invention relates to a Y-type hexagonal oxide magnetic material and an inductor element which can be advantageously applied for use in a high frequency range.

2. Description of the Related Art

In a high frequency circuit for use in various mobile communication devices such as a portable telephone and a wireless LAN, an inductor element with an air core coil structure, such as a chip inductor, is used to cover frequency ranges up to several GHz for various purposes including impedance matching, resonating and choking.

An air core coil is formed by winding a wire around a core made of a nonmagnetic material or by forming a coil pattern on a substrate made of a nonmagnetic material. Accordingly, it has a disadvantage in that it is necessary to increase the number of coil turns when a larger inductance is required. This is an impediment to the miniaturization of the inductor element. Furthermore, since the resistance of the wire grows in proportion to the number of coil turns, there is another problem in that it is not possible to provide an inductor having a high Q (gain) factor.

The Q factor represents a value obtained by dividing the real number part ($\mu'$) of the magnetic permeability by the imaginary number part ($\mu''$).

On the other hand, a hexagonal ferrite is known as a magnetic material for high frequency use which has an easy axis of magnetization in the surface perpendicular to the c axis. The magnetic permeability of the hexagonal ferrite having this in-plane magnetic anisotropy is attenuated at a frequency higher than that of the frequency limit (Snoek peak) of a spinel ferrite represented by a Ni—Zn—Cu ferrite. Accordingly, it is possible to reduce the number of coil turns in comparison with an air core coil when this ferrite is used, providing a possibility for miniaturizing an inductor element having such a coil.

However, even when a Ferrox planar type ferrite (which belongs to a group of hexagonal ferrites known to have the best high frequency characteristics) sintered compact is used, a frequency relaxation phenomenon caused by magnetic domain wall motion is observed, with the result that the frequency at which a high Q factor can be maintained is limited to the level of about 200 MHZ. Accordingly, a large improvement in the characteristics cannot be achieved in comparison with a spinel ferrite.

SUMMARY OF THE INVENTION

Accordingly, it is one of the objects of the present invention to provide a Y-type hexagonal oxide magnetic material which has a large magnetic permeability in the frequency range of from several MHZ to several GHz while maintaining a high Q factor.

Another object of the present invention is to provide a small-sized inductor element with a high Q factor using the above-described Y-type hexagonal oxide magnetic material.

To solve the above-described technical problems, the Y-type hexagonal oxide magnetic material according to the present invention is characterized in that it comprises at least Fe, Co and M (where M is at least one of Ba and Sr) as well as O, wherein the relationship of $x+3\sigma \leq 4$, preferably $x+3\sigma<4$, is satisfied, in which x represents the average grain size ($\mu$m) of a sintered compact thereof and σ represents the standard deviation of said grain size.

It is preferable that the Y-type hexagonal oxide magnetic material according to the present invention is obtained from a starting raw material by the steps comprising blending, calcination, grinding, molding and baking, where for the raw material, a hydroxide or a carbonate is used for the M, an iron oxide is used for the Fe, and an oxide or a carbonate is used for the Co, and that the ground powder obtained after the grinding step has a specific surface area of not less than about 5 $m^2/g$.

Furthermore, the Y-type hexagonal oxide magnetic material according to the present invention is preferably obtained from a Y-type hexagonal oxide magnetic powder calcined by a spray roasting process.

In the Y-type hexagonal oxide magnetic material according to the present invention, part of the Co may be replaced with at least one of Cu, Zn and Ni.

The present invention is also directed to an inductor element having a magnetic body composed of such a Y-type hexagonal oxide magnetic material as described above.

Other objects, advantages, and novel features of the invention will become more apparent from the following detailed description when taken in conjunction with the accompanying drawing and examples.

DESCRIPTION OF THE PREFERRED EMBODIMENTS

Figure 1:
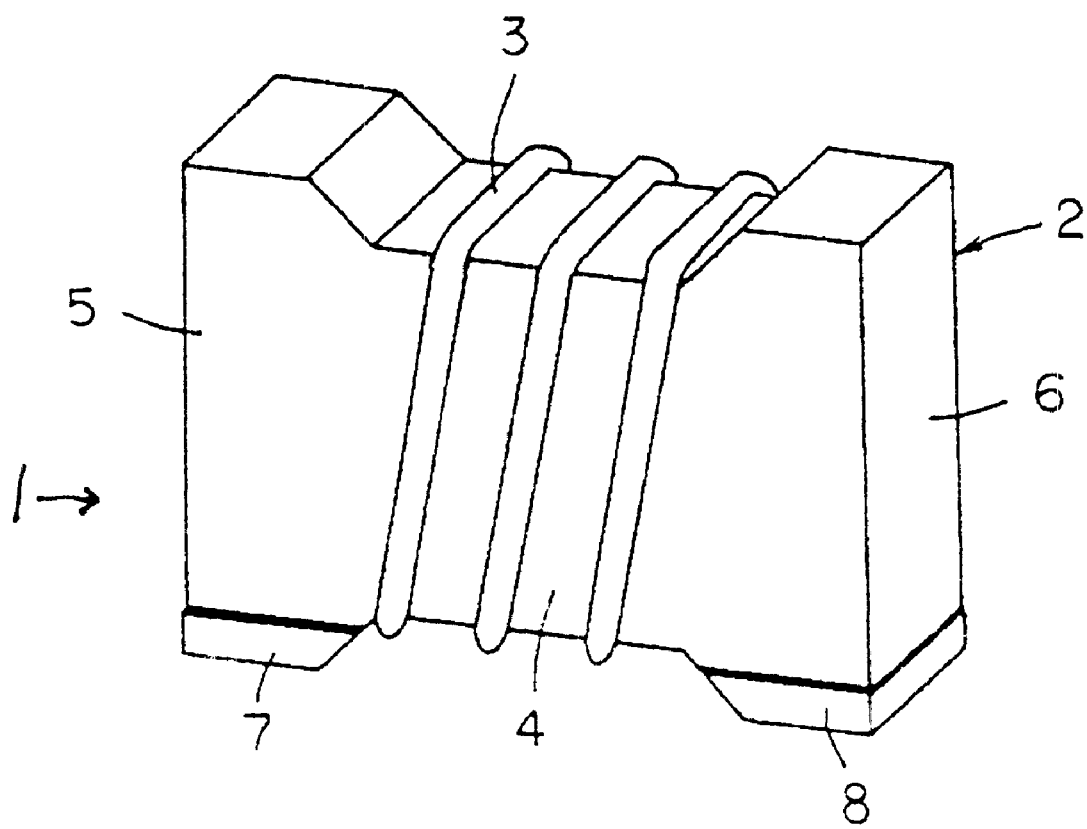
FIG. 1 is a perspective view showing the outer appearance of an inductor element 1 according to an embodiment of the present invention.

Although the present invention will be described with reference to the following FIGURE and examples, it is to be understood that the present invention is not limited to the precise embodiments described below, and various changes and modifications may be made to various usages and conditions without departing from the spirit and scope of the invention as described in the claims that follow.

FIG. 1 is a perspective view showing the outer appearance of an inductor element 1 according to an embodiment of the present invention.

The inductor element 1 comprises a core 2 as a magnetic body. An electroconductive wire 3 is wound around the core 2 in a spiral manner.

The core 2 has a body 4 around which the wire 3 is wound, and protruding potions 5 and 6 located on both ends of the body 4. The portions 5 and 6 protrude both upwards and downwards relative to the body 4.

Terminal electrodes 7 and 8 are each formed by plating or other methods, and extend from the lower surfaces of the protruding portions 5 and 6 to some part of the side surfaces adjacent to the lower surfaces. Although not illustrated in FIG. 1, both ends of the wire 3 are fixed onto these terminal electrodes 7 and 8 by heat welding, respectively.

A Y-type hexagonal oxide magnetic material according to the present invention can be advantageously used as a material for constructing the core 2, that is, a magnetic body constituting the above-described inductor element 1, or for constructing a magnetic body of an inductor element having a different structure, for example.

As described above, a Y-type hexagonal oxide magnetic material according to the present invention comprises at least Fe, Co and M (where M is at least one of Ba and Sr) as well as O, wherein the relationship of $x+3\sigma \leq 4$ is satisfied, in which x represents the average grain size ($\mu$m) of a sintered compact thereof and $\sigma$ represents the standard deviation of the grain size.

Hexagonal oxide magnetic materials are of various crystal types, such as the Z-type, W-type, Y-type and M-type. When they are used, and especially when a Y-type hexagonal oxide magnetic material is used, a small $\mu''$ can be obtained even in a high frequency range of not less than 200 MHZ, by setting the $x+3\sigma$ value to not more than about 4 $\mu$m, the value being obtained by adding the standard deviation ($\sigma$) multiplied by three to the average value (x), relative to the grain size ($\mu$m) of a sintered compact. The $\mu''$ is the imaginary number part of the magnetic permeability, indicating a loss due to the magnetic material. A decrease of the $\mu''$ makes it possible to provide a high Q factor in a high frequency range. This is considered to be caused by the fact that each of the grain sizes approaches the particle size of a single magnetic domain in a sintered compact of a Y-type hexagonal oxide magnetic material, and the decrease of the Q factor owing to the magnetic domain wall motion can be completely stopped.

Therefore, it is possible to allow the inductor element 1 to have a high Q factor in a high frequency range which is not less than 200 MHZ, by using, for the core 2, a Y-type hexagonal oxide magnetic material according to the present invention, as shown in FIG. 1.

Furthermore, a Y-type hexagonal oxide magnetic material according to the present invention has a magnetic permeability of about 2. Accordingly, when the material is used for the core 2, the number of coil turns of the wire 3 in the inductor element 1 can be decreased in comparison with the case of an air core. This effect contributes to the miniaturization and reduction in the direct current resistance of the inductor element 1 applied for use in a high frequency range.

A Y-type hexagonal oxide magnetic material according to the present invention is obtained from a starting raw material usually by the steps comprising blending, calcination, grinding, molding and firing, and, as described above, it comprises at least Fe, Co and M (where M is at least one of Ba and Sr) as well as O. It is preferable that a hydroxide or a carbonate of Ba and/or Sr, an iron oxide, and an oxide or a carbonate of Co are used as the starting raw materials. Furthermore, the ground powder obtained after the grinding step preferably has a specific surface area of not less than about 5 m$^2$/g.

Furthermore, the Y-type hexagonal oxide magnetic powder for use in obtaining a Y-type hexagonal oxide magnetic material according to the present invention may be prepared by calcination according to a solid phase method. However, it is particularly desirable to use a spray roasting process for the calcination.

In the Y-type hexagonal oxide magnetic material according to the present invention, part of the Co may be replaced with at least one of Cu, Zn and Ni.

The Y-type hexagonal oxide magnetic material according to the present invention will be explained below with reference to the examples. The examples below relate to a Y-type hexagonal oxide magnetic material having a chemical composition of $Ba_2Co_2Fe_{12}O_{22}$. However, it should be understood that a composition that deviates to some extent from this stoichiometrical composition is also within the scope of the present invention, as long as the main phase remains a hexagonal Y-type ferrite phase.

EXAMPLE 1

Barium carbonate ($BaCO_3$), cobalt oxide ($Co_3O_4$) and iron oxide ($Fe_2O_3$) as raw materials were each weighed out at a ratio to form a composition represented by the compositional formula of $Ba_2Co_2Fe_{12}O_{22}$ (referred to as "$Co_2Y$" hereinafter), were subjected to wet blending with a ball mill, and then subjected to calcination by a solid phase method in air at a temperature of from 900 to 1,300° C.

Next, the calcined powder thus obtained was further subjected to wet grinding with a ball mill to form a ground powder having a specific surface area of not less than about 5 m$^2$/g.

Next, the ground powder was kneaded with a vinyl acetate type binder, followed by drying so as to provide a powder for press molding. This powder for press molding was molded into a shape of a toroidal core, and the obtained molded bodies were baked in air at firing temperatures shown in Table 1. A constant pressure of about 300 kgf/cm$^2$ was applied to the molded bodies in the firing step so that all of the obtained sintered compact samples had almost the same density.

Image analysis of the grain sizes was conducted on the sintered compact samples thus obtained. The average particle sizes (x) and the standard deviations ($\sigma$) shown in Table 1 were each obtained by conducting the image analysis on 20 specimens for each sample, based on the images of the secondary electrons of an electron microscope, forming a histogram of the particle sizes, and then analyzing the histogram. Table 1 also shows $x+3\sigma$ values which were obtained by adding the standard deviations ($\sigma$) multiplied by three to the above-described average particle sizes (x).

Furthermore, the frequency characteristics, that is, the magnetic permeability ($\mu'$) and the Q factor were evaluated for each sintered compact sample, using an LCR meter. Table 1 shows the magnetic permeabilities ($\mu'$) and the Q factors at 200 MHZ. The Q factors were obtained by dividing the real number parts ($\mu'$) of the magnetic permeabilities by the imaginary number parts ($\mu''$).

Table 1 also shows the densities of the sintered compact samples according to the Archimedes method.

TABLE 1

| | | Co$_2$Y sintered compact | | | | | Density of |
|---|---|---|---|---|---|---|---|
| Sample No. | Firing temperature (° C.) | Average particle size (x) ($\mu$m) | Standard deviation ($\sigma$) ($\mu$m) | x + 3$\sigma$ ($\mu$m) | Magnetic permeability (200 MHZ) | Q factor (200 MHZ) | sintered compact (g/cm$^3$) |
| 1 | 1,000 | 1.9 | 0.3 | 2.8 | 1.9 | 117 | 4.7 |
| 2 | 1,025 | 2.0 | 0.4 | 3.2 | 2.1 | 112 | 4.8 |
| 3 | 1,050 | 2.5 | 0.4 | 3.7 | 2.4 | 105 | 4.8 |

TABLE 1-continued

| | | Co₂Y sintered compact | | | | | Density of |
|---|---|---|---|---|---|---|---|
| Sample No. | Firing temperature (° C.) | Average particle size (x) (μm) | Standard deviation (σ) (μm) | x + 3σ (μm) | Magnetic permeability (200 MHZ) | Q factor (200 MHZ) | sintered compact (g/cm³) |
| 4* | 1,075 | 3.2 | 0.3 | 4.1 | 2.8 | 82 | 4.9 |
| 5* | 1,100 | 3.3 | 0.3 | 4.2 | 3.1 | 42 | 5.0 |
| 6* | 1,125 | 3.5 | 0.4 | 4.7 | 3.4 | 35 | 5.2 |
| 7* | 1,150 | 3.7 | 0.5 | 5.2 | 3.5 | 20 | 5.1 |
| 8* | 1,175 | 4.2 | 0.4 | 5.4 | 4.2 | 7 | 5.1 |
| 9* | 1,200 | 4.4 | 0.3 | 5.3 | 4.6 | 4 | 5.2 |

In Table 1, those sample numbers with an asterisk ("*") represent the Comparative examples that were out of the scope of the present invention. They did not satisfy the relationship of x+3σ≦4.

From Table 1, it is understood that Samples 1, 2 and 3 which were within the scope of the present invention provided x+3s values of not more than about 4 μm by virtue of controlling the firing temperature, and therefore Q factors of not less than 100 could be obtained even at 200 MHZ.

In comparison, Samples 4 through 9 with x+3σ values exceeding about 4 μm provided greatly reduced Q factors at 200 MHZ. This is considered to be caused by the fact that coarse particles with large particle sizes were formed in the sintered bodies, with the result that relaxation due to magnetic domain wall motion occurred in the coarse particles.

It is to be noted that in Example 1, a method was employed in which the firing temperature was controlled so as to control the grain sizes of the sintered bodies. However, various other methods may be applied, including a method in which the particle size of the starting raw material (barium carbonate, iron oxide or cobalt oxide, for example) is controlled, a method in which the particle size of a calcined powder is controlled by the calcination temperature, a method in which the particle size of ground powder (that is, specific surface area) is controlled, etc.

EXAMPLE 2

In the same way as was employed for Example 1, barium carbonate ($BaCO_3$), cobalt oxide ($CO_3O_4$) and iron oxide ($Fe_2O_3$) as raw materials were each weighed out at a ratio to form a composition represented by the compositional formula of $Ba_2Co_2Fe_{12}O_{22}$, were subjected to wet blending with a ball mill, and then subjected to calcination in air at calcination temperatures of from 900 to 1,300° C. as shown in Table 2.

Next, the calcined powders thus obtained were further subjected to wet grinding with a ball mill to form ground powders. The ground powders having the specific surface areas shown in Table 2 were obtained by changing the grinding conditions, especially the grinding time.

Next, these ground powders were kneaded with a vinyl acetate type binder and then dried to provide powders for press molding. These powders for press molding were molded into a toroidal core shape. The molded bodies thus formed were baked in air at the firing temperatures shown in Table 2.

Table 2 shows the average particle sizes (x), x+3σ values, magnetic permeabilities, Q factors and densities of the Co₂Y sintered bodies, which were obtained by the same methods as were employed for Example 1.

TABLE 2

| | | | Co₂Y sintered compact | | | | | Density of |
|---|---|---|---|---|---|---|---|---|
| Sample No. | Calcination temp. (° C.) | Firing temp. (° C.) | Average particle size (x) (μm) | x + 3σ (μm) | Specific surface area of Co₂Y ground powder (m²/g) | Magnetic permeability (200 MHZ) | Q factor (200 MHZ) | sintered compact (g/cm³) |
| 10* | 900 | 1,200 | 4.1 | 5.1 | 4 | 2.7 | 18 | 4.7 |
| 11 | 900 | 1,150 | 1.8 | 2.8 | 15 | 2.7 | 110 | 4.8 |
| 12 | 900 | 1,100 | 1.8 | 2.7 | 25 | 2.8 | 100 | 4.8 |
| 13* | 1,100 | 1,200 | 4.0 | 5.3 | 1 | 2.8 | 18 | 4.6 |
| 14 | 1,100 | 1,150 | 1.7 | 2.7 | 5 | 2.8 | 120 | 4.8 |
| 15 | 1,100 | 1,100 | 1.5 | 2.5 | 15 | 2.9 | 100 | 4.7 |
| 16* | 1,300 | 1,200 | 4.2 | 5.2 | 1 | 2.7 | 18 | 4.5 |
| 17 | 1,300 | 1,150 | 1.7 | 2.4 | 6 | 2.8 | 100 | 4.8 |
| 18 | 1,300 | 1,100 | 1.3 | 2.2 | 18 | 2.7 | 120 | 4.9 |

In Table 2, those sample numbers with an asterisk ("*") represent Comparative examples that were out of the scope of the present invention. They had x+3σ values exceeding about 4 μm.

As is understood from Table 2, the ground powders of Samples 11, 12, 14, 15, 17 and 18 that were within the scope of the present invention had specific surface areas of not less than about 5 m²/g. Since the specific surface areas were controlled in this manner, they satisfied the relationship of x+3σ≦4. As a result, they had high Q factors of not less than 100 even at 200 MHZ.

In comparison, Samples 10, 13 and 16 that were out of the scope of the present invention had x+3σ values exceeding about 4 μm, with a result that the Q factors were reduced greatly as the frequency was raised from 100 MHZ to 200 MHZ.

EXAMPLE 3

Solutions of iron nitrate, barium nitrate and cobalt nitrate were mixed together at a ratio to form a composition represented by the compositional formula of $Ba_2Co_2Fe_{12}O_{22}$. A sample solution was thus prepared.

Next, this sample solution was sprayed into a roasting furnace with the temperature inside the furnace set to from 1,000 to 1,200° C. so as to obtain spherical $Co_2Y$ particles having specific surface areas of not less than about 5 $m^2/g$.

Next, these spherical particles were kneaded with a vinyl acetate type binder and then dried to provide a powder for press molding. The powder for press molding was molded into a shape of a toroidal core. The molded bodies thus formed were baked in air at the firing temperatures shown in Table 3.

Regarding Samples 19, 20 and 21 obtained by the above-described steps, the average particle sizes (x), x+3σ values, magnetic permeabilities, Q factors and densities of the $Co_2Y$ sintered bodies were obtained according to the same methods as were employed for Example 1. Table 3 shows the results. It is to be noted that the data for Samples 1 to 3 obtained from Example 1 and listed in Table 1, are shown in Table 3 again so as to make it easier to compare them with those of Samples 19 to 21.

higher densities, even at lower firing temperatures in comparison with Samples 1 to 3 which were obtained from $Co_2Y$ powders prepared by the solid phase method. This is advantageous from the viewpoint of energy saving.

EXAMPLE 4

Barium carbonate ($BaCO_3$), iron oxide ($Fe_2O_3$), cobalt oxide ($Co_3O_4$), copper oxide (CuO), zinc oxide (ZnO) and nickel oxide (NiO) were prepared as the raw materials and mixed together to form compositions represented by the compositional formula of $Ba_2(Co_{1-x}Me_x)_2Fe_{12}O_{22}$ (wherein Me is Cu, Zn or Ni). The molar ratios were as shown in Table 4.

Next, the mixed powders were subjected to wet blending with a ball mill, followed by calcination in air at a temperature of from 1,000 to 1,200° C.

Next, the calcined powders were subjected to wet grinding with a ball mill to form ground hexagonal Y-type ferrite powders having specific surface areas of not less than 5 $m^2/g$.

Next, the ground powders were kneaded with a vinyl acetate type binder and then dried to provide powders for press molding. These powders for press molding were molded into a shape of a toroidal core. The molded bodies thus formed were baked in air at firing temperatures shown in Table 4.

TABLE 3

| Sample No. | Method for preparing $Co_2Y$ powders | Firing temperature (° C.) | $Co_2Y$ sintered compact Average particle size (x) (μm) | x + 3σ (μm) | Magnetic permeability (200 MHZ) | Q factor (200 MHZ) | Density of sintered compact (g/cm³) |
|---|---|---|---|---|---|---|---|
| 19 | Spray roasting process | 950 | 1.8 | 2.6 | 1.8 | 112 | 4.8 |
| 20 | Spray roasting process | 975 | 2.1 | 3.0 | 2.3 | 119 | 4.8 |
| 21 | Spray roasting process | 1,000 | 2.6 | 3.6 | 2.6 | 111 | 4.9 |
| 1 | Solid phase method | 1,000 | 1.9 | 2.8 | 1.9 | 117 | 4.7 |
| 2 | Solid phase method | 1,025 | 2.0 | 3.2 | 2.1 | 112 | 4.8 |
| 3 | Solid phase method | 1,050 | 2.5 | 3.7 | 2.4 | 105 | 4.8 |

As shown in Table 3, Samples 19 to 21 which were sintered bodies obtained by firing the $Co_2Y$ powders prepared by calcination according to the spray roasting process, provided Y-type hexagonal oxide magnetic materials which had the same level of properties as that of Samples 1 to 3 which were sintered bodies obtained by firing the $Co_2Y$ powders prepared by calcination according to the solid phase method. All x+3σ values were not more than about 4 μm.

Furthermore, regarding the firing temperatures shown in Table 3, Samples 19 to 21 which were obtained from $Co_2Y$ powders prepared by the spray roasting process, provided For Samples 22, 23 and 24 that were thus obtained, the average particle sizes (x),x+3σ values, magnetic permeabilities, Q factors and densities of the $Co_2Y$ sintered bodies were obtained according to the same methods as were employed for Example 1. Table 4 shows the results. It is to be noted that the data for Sample 1 shown in Table 1 are listed in Table 4 again so as to make it easier to compare the results of Samples 22 to 24 with the data of Sample 1 obtained from Example 1 in which part of the cobalt oxide was not replaced with any of a copper oxide, zinc oxide and nickel oxide.

TABLE 4

| Sample No. | Fe$_2$O$_3$ (mole %) | BaO (mole %) | CoO (mole %) | CuO (mole %) | NiO (mole %) | ZnO (mole %) | Firing temp. (° C.) | Co$_2$Y sintered compact ||||
|---|---|---|---|---|---|---|---|---|---|---|---|
| | | | | | | | | Average particle size (x) (μm) | x + 3σ (μm) | Magnetic permeability (200 MHZ) | Q factor (200 MHZ) | Density of sintered compact (g/cm$^3$) |
| 22 | 60.0 | 20.0 | 15.0 | 5.0 | — | — | 900 | 2.1 | 2.9 | 1.8 | 99 | 4.9 |
| 23 | 60.0 | 20.0 | 15.0 | — | 5.0 | — | 1,050 | 2.3 | 3.2 | 2.1 | 105 | 4.6 |
| 24 | 60.0 | 20.0 | 15.0 | — | — | 5.0 | 1,050 | 2.4 | 3.6 | 2.7 | 98 | 4.7 |
| 1 | 60.0 | 20.0 | 20.0 | — | — | — | 1,000 | 1.9 | 2.8 | 1.9 | 117 | 4.7 |

As shown in the cases of Samples 22 to 24 listed in Table 4, a Y-type hexagonal oxide magnetic material having an x+3σ value of not more than about 4 μm, and having part of the Co replaced with at least one of Cu, Zn and Ni, can provide the same level of properties as that of a Y-type hexagonal oxide magnetic material exemplified by Sample 1 in which no such replacement was carried out.

As described above, the Y-type hexagonal oxide magnetic material according to the present invention comprises at least Fe, Co and M (where M is at least one of Ba and Sr) as well as O, wherein the relationship of x+3σ≦4 is satisfied in which x represents the average grain size (μm) of a sintered compact thereof and σ represents the standard deviation of the grain size. Thus, a high Q factor can be maintained in a high frequency range of not less than 200 MHZ, for example.

Owing to this, when an inductor element having a magnetic body composed of such a Y-type hexagonal oxide magnetic material is used, a high Q factor can be maintained at a frequency of not less than 200 MHZ, the decrease of inductance in a high frequency range is restricted and the number of coil turns can be decreased in comparison with that of an air core coil. Therefore, miniaturization of the inductor element is made possible.

The Y-type hexagonal oxide magnetic material according to the present invention is obtained from a starting raw material by the steps comprising blending, calcination, grinding, molding and firing. Regarding the raw material, a hydroxide or a carbonate is used for the M, an iron oxide is used for the Fe, and an oxide or a carbonate is used for the Co. When the ground powder obtained after the grinding step has a specific surface area of not less than about 5 m$^2$/g, it is possible to more surely make the x+3σ value of a sintered compact after the baking not more than about 4 μm.

Furthermore, when the Y-type hexagonal oxide magnetic material according to the present invention is obtained by using a Y-type hexagonal oxide magnetic powder calcined according to a spray roasting process, the density of a sintered compact is not decreased even if the Y-type hexagonal oxide magnetic material is baked at a relatively low temperature. It is accordingly advantageous from the viewpoint of energy saving.

What is claimed is:

1. A Y-type hexagonal oxide magnetic material comprising Fe, Co, M and O, wherein M is at least one of Ba and Sr, and wherein the material is sintered and the relationship x+3σ, in which x represents the average grain size in microns in a sintered compact thereof and σ represents the standard deviation of said grain size, is less than or equal to about 4.

2. A Y-type hexagonal oxide magnetic material according to claim 1, wherein the relationship x+3σ is less than 4.

3. A Y-type hexagonal oxide magnetic material according to claim 2, further comprising at least one of Cu, Zn and Ni.

4. A Y-type hexagonal oxide magnetic material according to claim 3, the material sintered comprises a powder having particles of specific surface area of not less than about 5 m$^2$/g.

5. A Y-type hexagonal oxide magnetic material according to claim 1, further comprising at least one of Cu, Zn and Ni.

6. A Y-type hexagonal oxide magnetic material according to claim 1, the material sintered comprises a powder having particles of specific surface area of not less than about 5 m$^2$/g.

7. A Y-type hexagonal oxide magnetic material according to claim 1, wherein M is Ba.

8. A Y-type hexagonal oxide magnetic material according to claim 1, wherein M is Sr.

9. An inductor element comprising a magnetic body comprising a shaped Y-type hexagonal oxide magnetic material according to claim 8.

10. An inductor element comprising a magnetic body comprising a shaped Y-type hexagonal oxide magnetic material according to claim 7.

11. An inductor element comprising a magnetic body comprising a shaped Y-type hexagonal oxide magnetic material according to claim 6.

12. An inductor element comprising a magnetic body comprising a shaped Y-type hexagonal oxide magnetic material according to claim 5.

13. An inductor element comprising a magnetic body comprising a shaped Y-type hexagonal oxide magnetic material according to claim 4.

14. An inductor element comprising a magnetic body comprising a shaped Y-type hexagonal oxide magnetic material according to claim 3.

15. An inductor element comprising a magnetic body comprising a shaped Y-type hexagonal oxide magnetic material according to claim 2.

16. An inductor element comprising a magnetic body comprising a shaped Y-type hexagonal oxide magnetic material according to claim 1.

17. A Y-type hexagonal oxide magnetic material according to claim 1 obtained by a process comprising blending starting materials comprising a hydroxide or carbonate of M, an oxide of Fe, and an oxide or carbonate of Co; followed by calcining, grinding to a powder whose particles have a specific surface area of not less than about 5 m$^2$/g, molding and sintering the blend.

18. A Y-type hexagonal oxide magnetic material according to claim 17, wherein said calcining comprises spray roasting.

* * * * *